US011658387B2

(12) United States Patent
Venture (10) Patent No.: US 11,658,387 B2
(45) Date of Patent: May 23, 2023

(54) TELESCOPIC MAST WITH RFID ANTENNAS FOR WAREHOUSE INVENTORIES

(71) Applicant: QUADIENT TECHNOLOGIES FRANCE, Bagneux (FR)

(72) Inventor: Guy Venture, Senas (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 196 days.

(21) Appl. No.: 17/162,208

(22) Filed: Jan. 29, 2021

(65) Prior Publication Data
US 2021/0242563 A1   Aug. 5, 2021

(30) Foreign Application Priority Data

Jan. 31, 2020  (EP) .................................... 20305092

(51) Int. Cl.
*H01Q 1/22*  (2006.01)
*H01Q 1/12*  (2006.01)
*H01Q 1/32*  (2006.01)

(52) U.S. Cl.
CPC ......... *H01Q 1/2216* (2013.01); *H01Q 1/1242* (2013.01); *H01Q 1/2225* (2013.01); *H01Q 1/32* (2013.01)

(58) Field of Classification Search
CPC . B25B 11/005; B25J 15/0061; B25J 15/0616; B25J 15/0658; B32B 17/10036; B32B 17/10761; B32B 17/10871; B32B 17/10889; B32B 2309/105; B32B 38/1858; B32B 38/1866; B65G 49/061; B66F 9/0755; C03B 23/0235; C03B 23/0256;
(Continued)

(56) References Cited

U.S. PATENT DOCUMENTS 3,941,213 A  * 3/1976 Stammen ............ B66F 9/07545
                                                            187/222
9,371,217 B1 * 6/2016 DePumpo ............... B66F 9/075
(Continued)

FOREIGN PATENT DOCUMENTS

EP  1444647 A1  8/2004
EP  2263966 A1  12/2010

OTHER PUBLICATIONS

European Search Report for EP 20 30 5092, dated Jul. 24, 2020, 2 pages.

*Primary Examiner* — Thien M Le
(74) *Attorney, Agent, or Firm* — Cozen O'Connor (57) ABSTRACT

A system for inventorying items by reading attached identifying RFID tags stored on palette racks comprising at least one vertical reference post equipped with at least one post marker, the system comprising an apparatus configured for reading the attached identifying tags, characterized in that the apparatus comprises: at least one telescopic mast, which can be vertically deployed and folded, at least one RFID antenna mounted onto the telescopic mast for emitting RFID signals towards the identifying RFID tags and for receiving response messages from the identifying RFID tags, a RFID reader for energizing the at least one RFID antenna and for reading the identifying RFID tags, a computer unit for controlling the RFID reader and storing data, and at least one height sensor for detecting the at least one post marker.

20 Claims, 5 Drawing Sheets

(58) Field of Classification Search
CPC .... C03B 35/145; G06Q 10/08; G06Q 10/087; H01Q 1/1242; H01Q 1/2216; H01Q 1/2225; H01Q 1/32
See application file for complete search history.

(56) References Cited

U.S. PATENT DOCUMENTS

| | | |
|---|---|---|
| 2002/0070862 A1 | 6/2002 | Francis et al. |
| 2003/0089771 A1* | 5/2003 | Cybulski ................ B65D 19/00 235/385 |
| 2006/0255948 A1* | 11/2006 | Runyon ................ H01Q 13/085 340/572.7 |
| 2006/0287759 A1* | 12/2006 | Charych ................ B66F 9/0755 700/213 |
| 2008/0024306 A1 | 1/2008 | Bomber et al. |
| 2009/0101447 A1* | 4/2009 | Durham ................ B66F 9/0755 187/238 |
| 2010/0226742 A1* | 9/2010 | Ladd ................... B66F 9/0655 414/495 |
| 2016/0281938 A1* | 9/2016 | Carpoff ................ F21L 14/04 |
| 2017/0109558 A1 | 4/2017 | Jones et al. |
| 2017/0183208 A1* | 6/2017 | Hasler .................. B66F 9/122 |
| 2019/0393830 A1* | 12/2019 | Reid, Jr. ............... F15B 15/14 |

\* cited by examiner

TELESCOPIC MAST WITH RFID ANTENNAS FOR WAREHOUSE INVENTORIES

TECHNICAL FIELD

The present invention relates to the field of logistics and of storage and inventory of various objects in general stores, workshops, libraries or other places of storage and it relates more particularly to the inventory of objects in warehouses.

BACKGROUND

Knowing the number of articles stored, in particular in the case of warehouses, is essential for operating a business. Articles present in a stock or in a warehouse could in principle be derived from inflows and outflows. However, in practice, deviations are routine due to human errors such as articles placed in the wrong place, picking errors, WMS (Warehouse Management System) recording errors or lost articles, or due to other factors such as theft. Therefore, an inventory, which is a process of identifying, counting and valuing articles present in a site or in a company, is typically regularly required. Additionally, companies, which have stocks, generally have legal obligations in terms of inventory. For example, in France, the commercial code requires that at least one inventory be performed every year.

Figure 1:
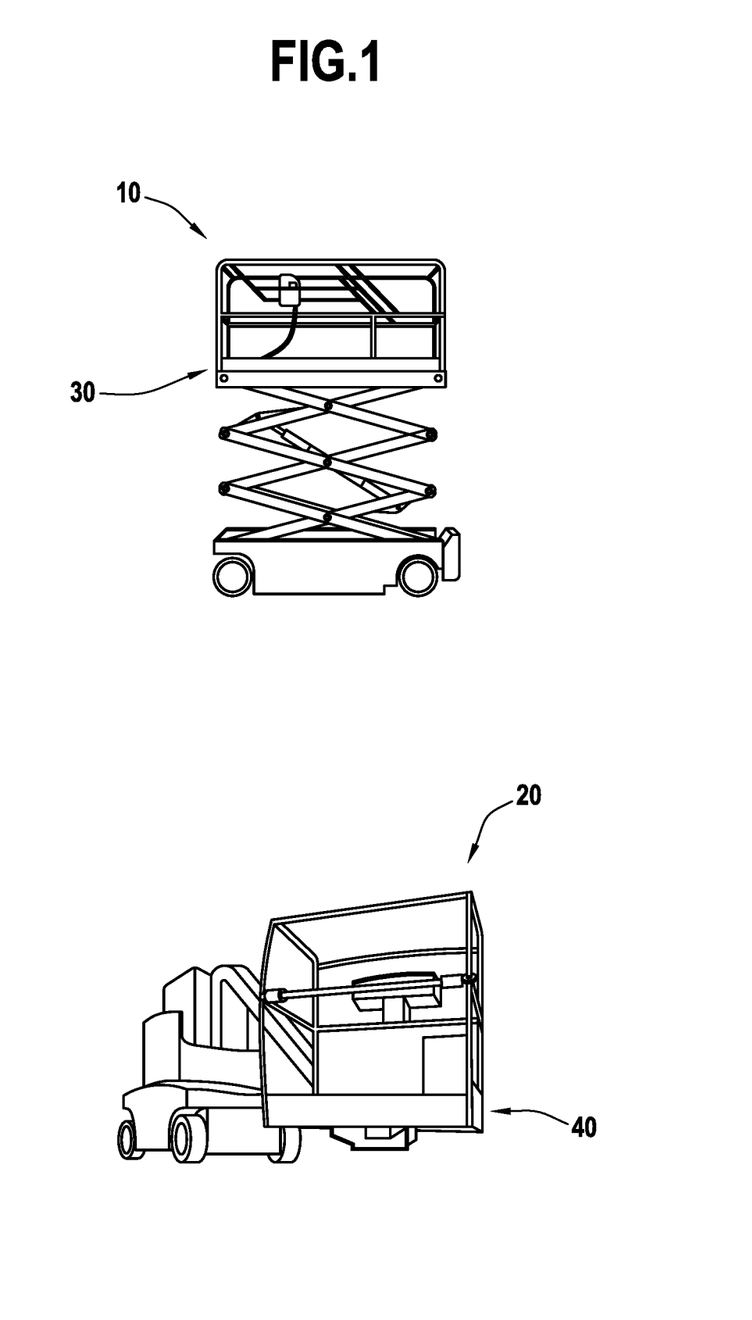
FIG. 1 illustrates prior art elevators for accessing all levels of racks in a warehouse.
Figure 2:
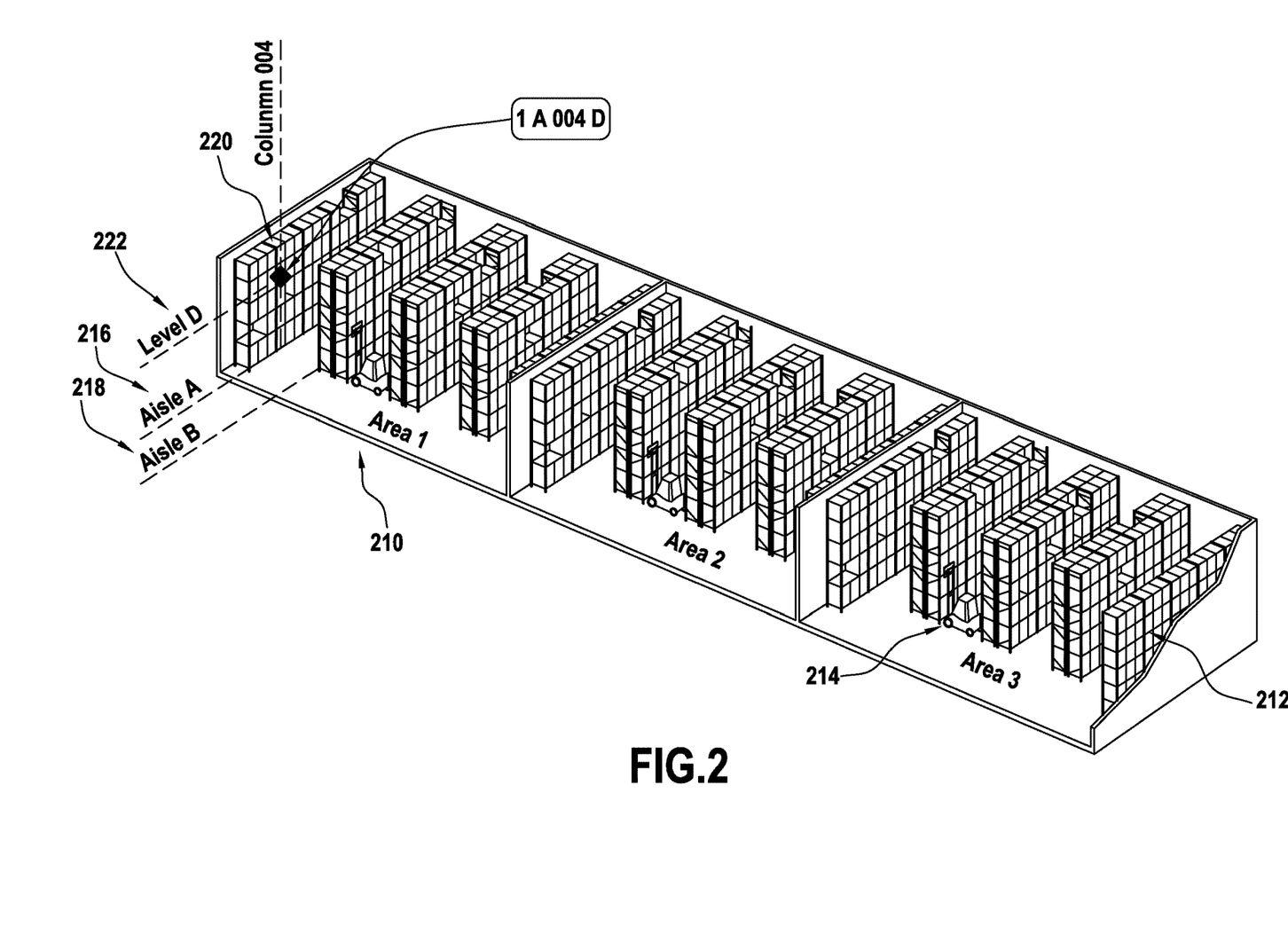
FIG. 2 illustrates a storage organization of a warehouse and an associated localization codification.

For a logistics service provider, an inventory is a physical operation, which can be an extremely tedious operation requiring significant resources and time. In order to optimize space, usually goods are placed in boxes, which are placed onto pallets, and are stored in large pallet racks. Pallet racks may have several rack levels and may culminate at more than 10 meters in height. Accessing all levels of the racks and precisely identifying all pallets and/or articles, requires the usage of an elevator such as a scissor lift 10 or a vertical mast 20 as represented on FIG. 1. Such elevators include an elevator platform 30 or 40 on which an operator can stand for performing inventory activities. A location in a pallets rack in a warehouse can be identified with a codification based on area, aisle, column and level. FIG. 2 illustrates a storage organization of a warehouse and an associated localization codification. The warehouse is divided in areas 210 such as area 1 on FIG. 2. Pallet racks 212 are aligned forming aisles in front of which a pallet truck 214 or an elevator 10 or 20 can drive along. For each pathway between two racks, there are two aisles 216 and 218 named aisle A and aisle B on FIG. 2, each corresponding to one of the two racks bordering the pathway. Each rack is organized in columns 220 and rack levels 222. For example, on FIG. 2, a palette can be stored in column 004 at rack level D. A standard codification for a palette localization is 01A004D, where 01 indicates the area 01 within the warehouse, A indicates the aisle A of area 01, 004 indicates the column 004 of the aisle A and D indicates the rack level D of column 004.

Generally, an inventory procedure includes the following acts: moving the elevator in a first area and aisle of the warehouse, positioning the elevator in front of a first column, and, once the operator is positioned onto the elevator platform, elevating the elevator platform to a first level of the palette rack. Then, the operator can scan the pallet or the article present on the pallet depending on the inventory level required. For an exhaustive physical inventory corresponding to a scanning of all the palettes stored in the warehouse, the elevator must be moved in front of each column of each palette rack, and the elevator platform must be elevated up to each rack level, which is a tedious resources and time consuming operation. So, there is a need for a solution improving the productivity and increasing the reliability of a warehouse inventory. With a faster and more reliable inventory operation, a logistics provider may be able to perform inventories more often. In addition to be more easily compliant with any local legislation, a faster inventory operation also provides an opportunity for a logistics provider to know almost in real time the actual status of its stock and benefit from this knowledge for optimizing his overall operation.

Object and Definition of the Invention

It is an object of the present invention to at least substantially overcome or ameliorate at least one or more of the disadvantages described above. This object is achieved by providing a system for inventorying items by reading attached identifying RFID tags stored on palette racks comprising at least one vertical reference post equipped with at least one post marker, the system comprising an apparatus configured for reading said identifying tags, characterized in that the apparatus comprises: at least one telescopic mast, which can be vertically deployed and folded, at least one RFID antenna mounted onto said telescopic mast for emitting RFID signals towards said identifying RFID tags and for receiving response messages from the identifying RFID tags, a RFID reader for energizing said at least one RFID antenna and for reading said identifying RFID tags, a computer unit for controlling the RFID reader and storing data, and at least one height sensor for detecting said at least one post marker.

In a preferred embodiment, the telescopic mast is constituted of a set of at least two cylinders, wherein the at least two cylinders of the set can slide into each other.

According to a feature of the invention, the at least one height sensor and the at least one RFID antenna are attached on each of said at least two cylinders.

According to another feature of the invention, the at least one height sensor is positioned at a fixed vertical distance from the center of the at least one RFID antenna.

The system according claim 4, characterized in that a value of the fixed vertical distance is stored in the computer unit.

In a particular embodiment, the apparatus further comprises a supporting pedestal and the supporting pedestal is shaped with two parallel longitudinal cavities for being easily handled by a forklift.

Advantageously, the at least one RFID antenna is oriented and is emitting in a direction perpendicular to a longitudinal axis of the two parallel longitudinal cavities.

In another embodiment, the palette racks comprise several rack levels and, for each rack level of the palette racks, a height marker is attached on the at least one vertical reference post at a same distance above a shelf corresponding to the rack level. Advantageously, the height marker is an optical reflector.

In a particular embodiment, the height marker is a RFID tag. And, preferably, the at least one height sensor is the at least one RFID antenna.

In a particular embodiment, the height values are stored in the height marker.

According to a feature of the invention, the computer unit is configured for calculating a travel adjustment Ta for the at least two cylinders based on the height values.

According to another feature of the invention, the at least one post marker is attached at the same height as the height marker.

In a preferred embodiment, the at least one post marker is a RFID tag.

In another embodiment, the computer unit is configured for calculating a travel adjustment Ta for the at least two cylinders based on height information stored in the post marker. Advantageously, the height information comprising a height indicator indicating a change in shelf height and whether the shelf height is taller or lower, is stored in the post marker.

In a particular embodiment, the apparatus is constituted of two telescopic masts, each comprising the at least one RFID antenna.

According to a feature of the invention, the apparatus comprises two sets of the at least one RFID antenna, each set emitting in an opposite direction of the other one.

Advantageously, the apparatus is attached to and conveyed by an automatic guided vehicle.

The invention also concerns an apparatus for inventorying items by reading attached identifying RFID tags stored on palette racks comprising at least one vertical reference post equipped with at least one post marker, characterized in that it comprises: at least one telescopic mast, which can be vertically deployed and folded, at least one RFID antenna mounted onto said telescopic mast for emitting RFID signals towards the identifying RFID tags and for receiving response messages from the identifying RFID tags, a RFID reader for energizing said at least one RFID antenna and for reading said identifying RFID tags, a computer unit for controlling the RFID reader and storing data, and at least one height sensor detecting said at least one post marker.

Preferably, the telescopic mast is constituted of a set of at least two cylinders, wherein the at least two cylinders of the set can slide into each other.

According to a feature of the invention, the at least one height sensor and the at least one RFID antenna are attached on each of said at least two cylinders.

Advantageously, the at least one height sensor is positioned at a fixed vertical distance from the center of the at least one RFID antenna.

In a preferred embodiment, a value of the fixed vertical distance is stored in the computer unit.

In a particular embodiment, a supporting pedestal of the apparatus is shaped with two parallel longitudinal cavities for being easily handled by a forklift.

Preferably, the at least one RFID antenna is oriented and is emitting in a direction perpendicular to a longitudinal axis of the two parallel longitudinal cavities.

According to another feature of the invention, the at least one presence sensor is attached onto the at least two cylinders for detecting a presence of a palette wherein the computer unit is configured for displaying empty palettes locations or for providing a warning explaining that identifying RFID tags may be missing when a palette is detected by a presence sensor and no RFID signal is received by the corresponding RFID antenna.

In another embodiment, the apparatus comprises two telescopic masts, each comprising said at least one RFID antenna.

According to a feature of the invention, the apparatus comprises one telescopic mast comprising two sets of said at least one RFID antenna, each set emitting in an opposite direction of the other one.

Advantageously, the apparatus is attached to and conveyed by an automatic guided vehicle.

The invention also concerns a method for inventorying items with an apparatus by reading attached identifying RFID tags stored on palette racks comprising at least one vertical reference post equipped with at least one post marker within a warehouse comprising the following acts: deploying vertically the telescopic mast of said apparatus, reading said identifying tags by said apparatus with RFID antennas mounted onto the telescopic mast, wherein the RFID antennas are energized by a RFID reader, when said at least one post marker attached onto said at least one vertical reference post is detected by height sensors of said apparatus, identifying said at least one vertical reference post based on the reading of said at least one post marker, and adjusting the vertical deployment of said telescopic mast before continuing reading said identifying RFID tags, and folding vertically the telescopic mast when all items are inventoried.

In a preferred embodiment, the telescopic mast is constituted of a set of at least two cylinders, wherein the at least two cylinders of the set can slide into each other and wherein the telescopic mast is deployed starting with the lowest cylinder up to the highest cylinder. Therefore, the deployment of the lowest RFID antenna does not impact the position of the above RFID antennas.

In another embodiment, one height sensor amongst the height sensors and one RFID antenna amongst the RFID antennas are attached onto each of said at least two cylinders.

Preferably, the palette racks comprise several rack levels and for each rack level of the palette racks, a height marker is attached on the at least one vertical reference post at a same distance above a shelf corresponding to the rack level.

According to another feature of the invention, the method further comprises: orienting the height sensors in the direction of the height markers, activating the one height sensor, raising the at least two cylinders, capturing a signal returned from a height marker detected by the height sensor, determining a position of the at least two cylinders based on the returned signal and based on a fixed distance Hms between height markers and corresponding shelves of the palette racks and based on a stored value of a fixed vertical distance Hsa between the one height sensor and the one RFID antenna, and stopping the raising of the at least two cylinders according to the determined position. Thus, the vertical positioning of the RFID antennas is automated by using height markers and height sensors, and the operator only has to initiate the deployment of the telescopic mast for the RFID antennas to be automatically positioned at their correct height.

In a preferred embodiment, the at least one post marker is a RFID tag and the height sensors are the RFID antennas and the method further comprises: orienting the height sensors in the direction of the height markers, activating the one height sensor, raising the at least two cylinders, capturing a signal returned from a height marker detected by the one height sensor, calculating a travel adjustment Ta based on a distance H between a targeted height for the one RFID antenna and a corresponding shelf position and based on a fixed distance Hms between the height markers and corresponding shelves of the palette racks, continuing raising the at least two cylinders according to the travel adjustment, and stopping the raising of the at least two cylinders.

In a particular embodiment, the travel adjustment is calculated according to the formula: $Ta = H - Hms$.

Advantageously, the high values corresponding to the distance H and to the fixed distance Hms are stored in the at least one post marker.

In a preferred embodiment, the method further comprises: initiating inventory capture, automatically energizing the RFID antennas, transporting the apparatus along an aisle of the warehouse, while reading the attached identifying tags with the RFID reader, processing into data totally or partly information read from the attached identifying tags or from the at least one post marker or the height markers affixed onto the palette racks, and wirelessly transferring the data to a remote data processing system.

In a particular embodiment, the method further comprises: reading the at least one post marker while transporting the apparatus along an aisle of the warehouse, stopping in front of at least one post marker for adjusting the telescopic mast deployment, if the post marker is detected by the lowest height sensor, interpreting shelf height as lower and lowering the at least two cylinders starting with the lowest cylinder up to the highest cylinder and stopping lowering the at least two cylinders based on a signal returned from a height marker, and, if the post marker is detected by a height sensor other than the lowest height sensor, interpreting shelf height as taller and raising the at least two cylinders starting with the lowest cylinder up to the highest cylinder and stopping raising the at least two cylinders based on a signal returned from a height marker. Thus, the telescopic mast is automatically adjusted for the RFID antennas to be positioned at their correct height.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

Figure 3:
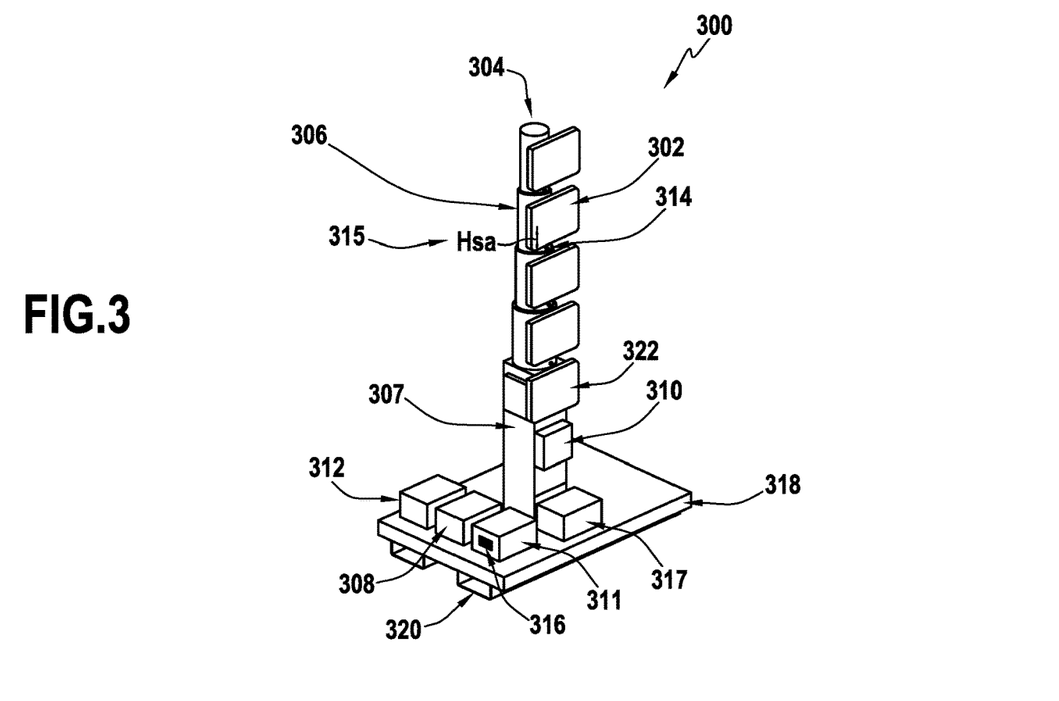
FIG. 3 represents an apparatus according to an embodiment of the invention constituted of several RFID antennas mounted on a telescopic mast in a folded configuration.

FIG. 3 represents an apparatus 300 constituted of several RFID antennas 302 mounted on a telescopic mast 304 in a folded configuration according to an embodiment of the invention. Each RFID antenna can be used for reading identifying RFID tags attached onto palettes or articles stored on a palette rack. These RFID antennas can be with circular or linear polarization. The telescopic mast 304 can be positioned in front of a column of a palette rack and can be vertically deployed so that each RFID antenna may be positioned in front of a different level of the palette rack. The number of RFID antennas needs to be equal or larger than the number of levels of the palette rack. The deployment of the telescopic mast 304 is illustrated on FIG. 4, which represents the apparatus 300 with the telescopic mast in a deployed configuration according to an embodiment of the invention. The folded configuration of the telescopic mast is applied for example when the apparatus 300 is stored between inventories as it is not in use, or when the apparatus 300 must be displaced at a high speed. The deployed configuration of the telescopic mast 304 is applied when the apparatus 300 is used for reading identifying RFID tags once positioned in front of a column of a palette rack, or when the apparatus 300 is displaced at low speed. Once the telescopic mast is deployed in front of a rack within an aisle, the apparatus 300 may be displaced along the aisle and the inventory may be performed continuously.

The telescopic mast is constituted of cylinders 306, which can slide into each other. The cylinders represented on FIG. 3 have a circular section, but other sections may be used such as square or almost square sections. The telescopic mast is maintained vertically by a base 307. The sliding of the mast cylinders and the vertical positioning of the RFID antennas is controlled by a mast controller 308 included in the apparatus 300. An RFID reader 310 can energize the RFID antennas for emitting RFID signals towards identifying RFID tags attached to pallets or articles and for receiving response messages from the identifying RFID tags. This RFID reader, which is embarked onto the apparatus 300, can be attached to the base 307 of the telescopic mast 304. The RFID reader is controlled by a computer unit 311, which also manages the flow of data captured by the RFID antennas and performs the storing information exchanged between the reader and the RFID tags. The computer unit attached to the apparatus 300 may integrate the mast controller 308 as illustrated on FIG. 4 or may be separate and working in cooperation with the mast controller 308 as illustrated on FIG. 3. The apparatus 300 is powered by an autonomous power supply block 312, which provides energy to all electrical components comprised in the apparatus 300. In a preferred embodiment, a height sensor 314 may be attached to each mast cylinder 306 for automating the deployment of the telescopic mast as it will be described in more details below in the section corresponding to FIG. 5. For each mast cylinder, the height sensor is positioned at a fixed vertical distance Hsa 315 from the center of the corresponding RFID antenna. A value 316 of the fixed vertical distance Hsa is stored in a memory of the computer unit 311.

According to FIG. 3, the apparatus 300 can include a communication module 317 for transferring data collected by the apparatus 300 to a remote data processing system, which manages the warehouse inventory. Preferably, this transfer is performed wirelessly for example using Bluetooth or WiFi communication. In such a configuration, depending on the available memory capacity and processing capabilities of the computer unit of the apparatus 300, the information captured regarding the warehoused objects may be processed totally or partly, in real time or latter, by the computer unit or may be remotely processed by the remote data processing system.

In a particular embodiment of the invention, the different components of the apparatus 300 are attached to a supporting pedestal 318, which in particular securely holds the base of the telescopic mast. The supporting pedestal, preferably in metal, is shaped for being easily handled by a forklift, which is the most commonly used transporting vehicle in warehouses. The mast 304 is solidly attached to such a supporting pedestal, preferably in a central position of the supporting pedestal. All control and electrical equipment, including the mast controller 308, the autonomous power supply block 312, possibly the RFID reader 310 or the communication module 317, and eventually the computer unit 311 can be attached onto the supporting pedestal. Two parallel and longitudinal cavities 320 provided in the lower part of the supporting pedestal would be used for sliding in the forks of a forklift, so that the apparatus 300 can be held and transported by the forklift. The apparatus 300 could be controlled by the operator of the forklift with a user interface installed onto the forklift and communicating via wireless short distance communication with the controller of the apparatus 300 via the communication module 317. This user interface can provide to the operator some information and feedback regarding the inventory and the operation of the apparatus 300. It may in particular display, preferably graphically, the status of the different components of apparatus 300 and the positions of the RFID antennas, as well as inventory data and statistics regarding for example inventoried items and their locations, palettes and their locations, and missing items or palettes. The user interface may be common for WMS reporting and for the control and monitoring of the apparatus 300. According to this embodiment, the apparatus 300 can be transported along the aisles of the warehouse for performing a continuously inventory, using a forklift commonly used by warehouse personnel and therefore optimizing the handling of this new equipment. All the RFID antennas 302 of the apparatus 300 are oriented in the same direction and the emitting direction of the RFID antennas is perpendicular to the longitudinal axis of the cavities 320. Thus, the RFID antenna emitting surface is parallel to the movement direction of the apparatus 300 along the aisle and is parallel to the front plane of the palette rack to be inventoried, therefore the RFID antenna emitting direction is oriented towards the palettes and/or articles to be inventoried.

The low level RFID antenna 322 is positioned for scanning ground level palettes and/or articles. It may not need to be attached to a mobile mast cylinder, but could be attached at a fixed vertical position onto the base 307 of the telescopic mast. In some warehouses, the ground level is used for picking articles eventually stored into palettes. When the need is only to inventory palettes or complete palettes, no scanning is required at the ground level and a low level RFID antenna 322 would not be used or may not have to be installed. In such a case, the lowest inventoried rack level is the first rack level or level B on FIG. 2.

Figure 4:
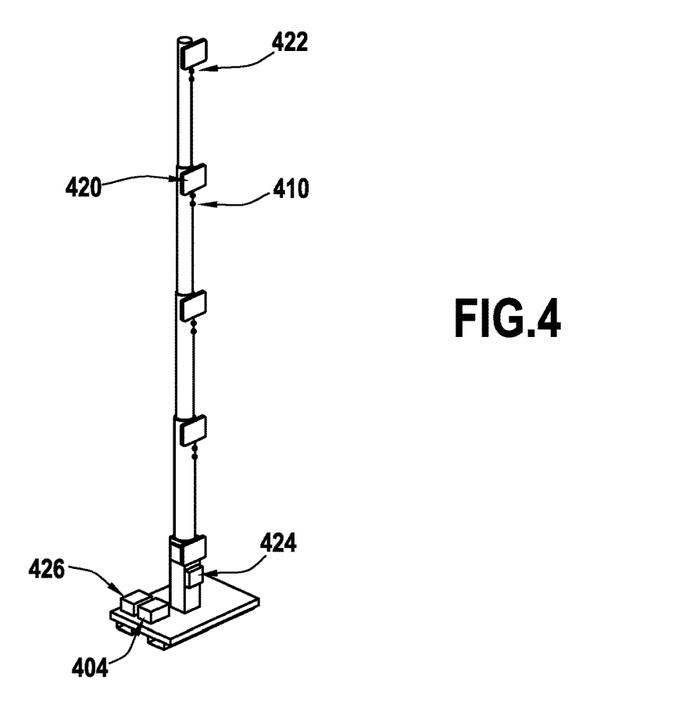
FIG. 4 represents an apparatus according to an embodiment of the invention with a telescopic mast in a deployed configuration.

FIG. 4 represents the apparatus 300 with a deployed telescopic mast and with a configuration with an integrating computer unit 405. Advantageously, a presence sensor 410 is attached onto each mast cylinder as represented on FIG. 4 for detecting the presence of a palette. This presence sensor can be for example an ultrasound sensor, and is preferably attached below a corresponding RFID antenna 420 and attached onto the same mast cylinder. There is no particular constraint on the position of the ultrasound sensor, except that it should not be too far below the corresponding RFID antenna so that it can be positioned in front of the lower part of palettes to be detected, and can easily detect the palettes whatever the height of these palettes. The ultrasound sensor can for example be attached just below the height sensor 422. RFID antennas are energized by a RFID reader 424. The integrating computer unit 405 controls the RFID reader, manages the flow of data captured by the RFID antennas, controls the mast deployment or folding and includes a communication module. All electrical components comprised in the apparatus 300 are powered by an autonomous power supply block 426. Data captured by a presence sensor and the corresponding RFID antenna can be compared by the computer unit 405. When a palette is detected by a presence sensor, but no RFID signal is received by the corresponding RFID antenna, a warning explaining that identifying RFID tags may be missing can be provided to the remote data processing system and/or to the operator via the user interface installed onto the forklift. Another benefit of the presence sensor is that empty palettes locations may be detected and mapped by the remote data processing system and/or displayed to the operator via the user interface installed onto the forklift.

Figure 5:
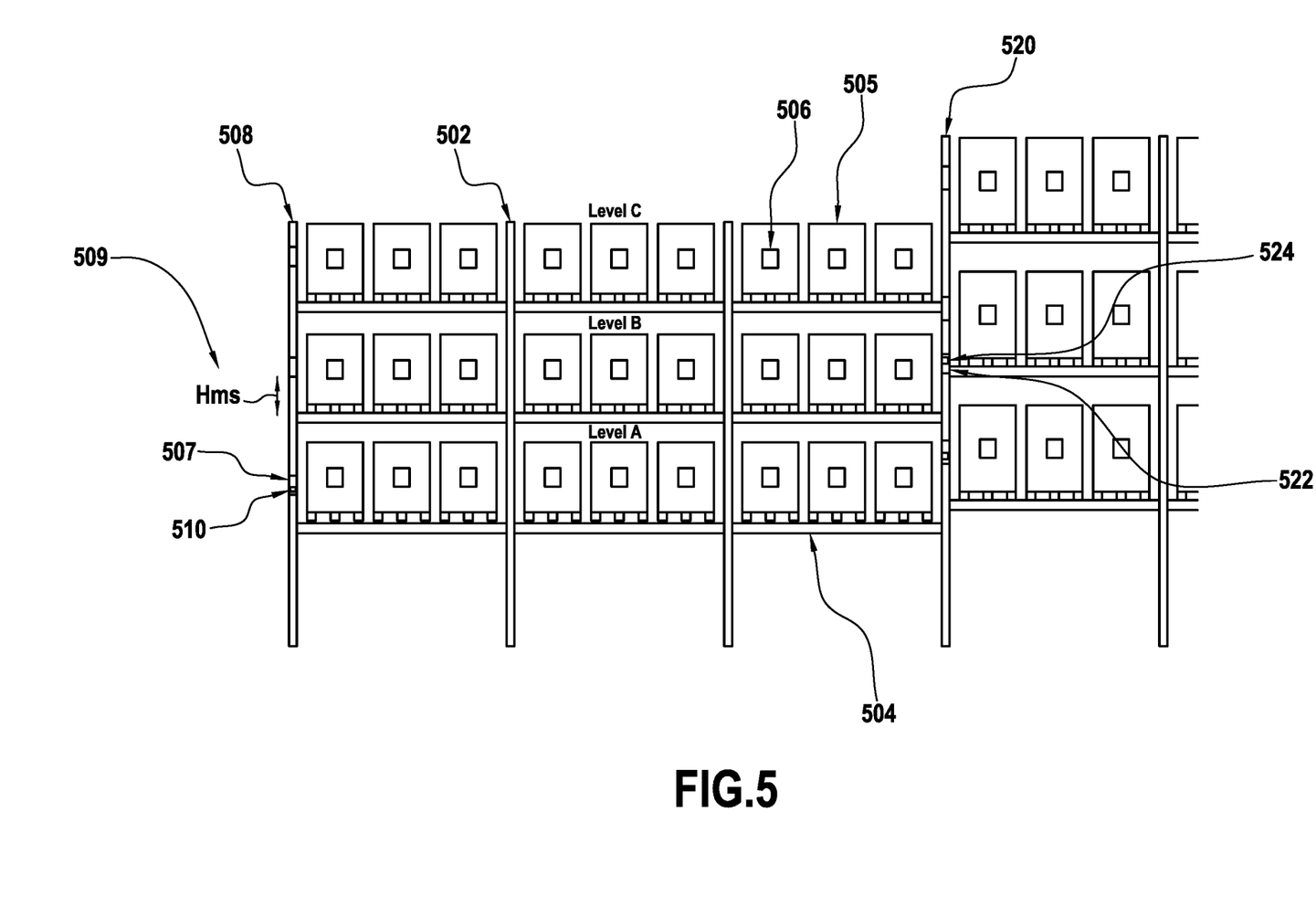
FIG. 5 illustrates a an example of a rack for automating the deployment of a telescopic mast of an apparatus 300.

For a correct operation of apparatus 300, the RFID antennas need to be correctly positioned compared to the location of the items to be scanned and identified, i.e. each RFID antenna must be positioned in front of each level of a palette rack of a particular aisle. Then, the apparatus 300 can be moved along the aisle without changing the height position of the RFID antennas for to scanning all items located in the aisle. An RFID antenna should be positioned at a height corresponding preferably, to one third of the height of the rack level assigned to the RFID antenna. The operator may deploy the telescopic mast and visually adjust the height position of each RFID antenna. However, in a preferred embodiment of the invention, the vertical positioning of the RFID antenna may be automatized in order to ease the personnel operation and secure the height positions of the RFID antennas. FIG. 5 illustrates an example of rack for automating the deployment of a telescopic mast of an apparatus 300. The palette rack is constituted of vertical posts 502 held together by horizontal shelves 504 on which palettes 505 are stored. An identifying RFID tag 506 is attached onto each palette. For each level of the palette rack, a height marker 507 is attached on a reference post 508 at a fixed distance Hms 509 above a shelf corresponding to that rack level, i.e. each height marker are attached at the same fixed distance Hms from the corresponding shelf. Each height markers is designed for interacting with a height sensor 314 attached onto each cylinder 306 of the telescopic mast 304. For each mast cylinder, the height sensor is positioned at a fixed vertical distance Hsa 315 from the corresponding RFID antenna. The detection of a height marker by the corresponding height sensor provides the information for the mast controller 308 to vertically deploy the corresponding mast cylinder and position the corresponding RFID antenna at the correct height, i.e. deployment position. Preferably, the height markers can be optical reflectors with corresponding optical sensors used as height sensors, which emit an optical signal and sense a reflected signal from the optical reflectors. When optical reflector and optical sensors are used, the fixed distance Hms is defined so that during the deployment of a mast cylinder, when the optical sensor of that particular mast cylinder detects a reflected signal from an optical reflector, the deployment of the mast cylinder is stopped and the RFID antenna of that particular mast cylinder is positioned at the correct height for reading identifying RFID tags of pallets and/or articles stored on the corresponding rack level. Optical reflectors are attached at a fixed distance Hms, which depends on the targeted height for the RFID antenna and on the position of the height sensor relatively to the RFID antenna (i.e. Hsa) according to the relation:

$$Hms = H - Hsa$$

where H is the distance between the targeted height for the RFID antenna and the shelf position, and Hsa is the distance between the height sensor and the RFID antenna.

The height markers could also be RFID location tags with corresponding specific RFID antennas used as height sensors, which emit a RFID signal and sense a response signal from the RFID location tags used as height markers. In the case of RFID tags used as height markers, a more economical solution is to use each RFID antenna 302 as a height sensor and define its deployment position based on the vertical position where the RFID antenna detects a signal peak received from the corresponding RFID location tag. Preferably, signal peak detection shall be based on RSSI (Received Signal Strength Indication) value calculation. In this particular case where each RFID antenna is used as a height sensor, the fixed distance Hsa 315 is nul. When the fixed distance Hsa is nul, a value 316 of the fixed distance Hsa is not required to be stored in the computer unit 311. The RFID height markers are attached on reference posts at a fixed distance Hms from a shelf. The deployment of a RFID antenna depends on the position of the RFID height markers and on the targeted height for the RFID antenna, and, once the RFID height marker has been detected, a travel adjustment Ta for the corresponding mast cylinder can calculated by the mast controller according to the relation:

$$Ta=H-Hms$$

where H is the distance between the targeted height for the RFID antenna and the shelf position, and Hms is the fixed distance between the height marker and the shelf.

Each height marker referencing a particular rack level must be attached on a reference post at the same fixed distance Hms from a shelf corresponding to that rack level. A controller attached to the apparatus 300, either the mast controller or the computer unit controller, can perform the calculation of Ta based on Height values 510 of the height parameters H and of Hms. These Height values can be stored in the remote data processing system and transferred to the controller attached to the apparatus 300 via the communication module 317. Preferably, these Height values can be stored in the RFID height markers. In the simplest implementation, all the stored Height values are identical and all the height markers referencing a particular rack level are attached on a reference post at exactly the same fixed distance Hms from a shelf corresponding to that rack level. However, storing Height values in the RFID height markers allows for using different values and adjusting the deployment of the mast at different rack levels depending on the shelf heights. In a simplified embodiment of the invention, the height markers are attached at the targeted height for the corresponding RFID antenna. In such a case: H=Hms, and no Height values need to be stored either in the remote data processing system or the RFID height markers.

For an aisle with homogeneous shelf heights, a reference post hosting the height markers should be positioned at the entry of the aisle. If the shelf heights changes within an aisle or within a palette rack, an intermediate reference post 520 needs to be installed at the location where the shelf height changes so that the telescopic mast may be automatically adjusted. Conveniently, this intermediate reference post should be identified by a post marker 522 and preferably automatically detected so that the RFID antennas could be redeployed according to the height markers of this intermediate reference post. If the shelf heights are homogeneous within an area of the warehouse, only one reference post would be required at the entry of the area. If the shelf heights are homogeneous within the whole warehouse, only one reference post would be required for the entire warehouse. In such a case, a non-telescopic mast with predefined RFID antenna positions could be used, but would not be convenient for storage between inventories or for transportation especially at high speed. A reference post may be installed at the entry of each area or of each aisle so that an inventory may be started or continued after an interruption from any area or any aisle of the inventory and the telescopic mast may be deployed in front of that entry reference post. In the case of non-homogeneous shelf heights, there should be as many intermediate reference posts with a post marker 522 as there are changes of shelf heights.

In a preferred embodiment, the post marker of each intermediate reference post is attached at the same height as one of the height markers of the preceding reference post (either an entry reference post or an intermediate reference post). Therefore, the height sensor 314 corresponding to this particular one of the height markers can easily detect the post marker. Conveniently, the apparatus 300 should be able to capture an information indicating whether the shelf heights are taller or lower so that the telescopic mast may be automatically adjusted. The vertical position of the post marker can provide such an information. For example, when the post marker is detected by the lowest height sensor, the computer unit interprets the shelf height is lower and that the mast cylinders need to be lowered. When the post marker in detected by a height sensor other than the lowest height sensor, the computer unit interprets the shelf height is taller and that the mast cylinders need to be raised. Preferably, the post marker can be an optical reflector cooperating with a corresponding optical sensor, which emits an optical signal and senses a reflected signal from the optical reflector. The post marker could also be a RFID location tag cooperating with a corresponding specific RFID antenna, which emits an RFID signal and senses a response signal from the post marker. In the case of RFID tags used as height markers, as discussed above, the height sensors can simply be the RFID antennas 302. The signal returned by the post marker to the height sensor is specific so as to indicate that there is a change in the shelf heights and that the telescopic mast requires a deployment adjustment. If the post marker is a RFID tag, a specific information indicating a shelf heights change is pre-stored in the RFID tag and returned within the response message when interrogated by the apparatus 300. If the post marker is an optical reflector, its detection by a height sensor indicates the presence of an intermediate reference post and of a change in shelf heights. Therefore, a post marker can be an optical reflector identical or similar to a height marker. If the post marker is a RFID tag, height information 524 including a height indicator indicating a change in the shelf heights and whether the shelf heights are taller or lower, can be stored digitally in the post marker. A controller attached to the apparatus 300, either the mast controller or the computer unit controller, can process the height indicator stored in the RFID post marker and read by the RFID antenna and RFID reader system. Based on the height indicator value, the telescopic mast deployment is automatically adjusted and the mast cylinders are either lowered or raised.

In another embodiment of the invention, in order to improve inventory efficiency, both aisles A and B on FIG. 2 may be scanned at the same time by the apparatus of the invention being driven between two parallel pallets racks. The apparatus is constituted of two telescopic masts, each having a set of RFID antennas. A first telescopic mast has its RFID antennas directed towards the left, i.e. towards the pallet rack of aisle A and a second telescopic mast has its RFID antennas directed towards the right, i.e. towards the pallet rack of aisle B. Each telescopic mast can be deployed independently according to reference posts positioned at the entry of the aisles. If the shelf heights are the same for the two aisles, only one reference post is required at the entry of the aisle and the deployment of the two telescopic masts can be synchronized. In the particular embodiment of an apparatus 300 comprising a supporting pedestal 318, all the RFID antennas 302 are oriented so that the emitting direction of the RFID antennas is perpendicular to the longitudinal axis of the cavities 320 with the RFID antennas of the first telescopic mast being directed towards the pallet rack of aisle A on the left and the RFID antennas of the second telescopic mast being directed towards the pallet rack of aisle B on the right.

In a particular embodiment, if both aisles A and B on FIG. 2 are symmetric or if the shelf heights are homogeneous, a set of RFID antennas directed towards the left, i.e. towards the pallet rack of aisle A and a set of RFID antennas directed towards the right, i.e. towards the pallet rack of aisle B, can be deployed at the same heights. The apparatus can be constituted of only one telescopic mast as described in FIG. 3 or 4, but with two sets of RFID antennas. The RFID antennas of each set would be respectively attached at the same height position on the telescopic mast and would be positioned symmetrically relatively to the vertical axis of symmetry of the telescopic mast and directed either towards the pallet rack of aisle A or towards the pallet rack of aisle B.

It is easily devised by those ordinary skilled in the art that vehicles other than forklifts could be used for moving the apparatus 300 of the invention within the aisles of a warehouse. The apparatus 300 may in particular be attached to and conveyed by an Automatic Guided Vehicle (AVG). Such AVG can follow marked lines or wires on or within the floor, or may use radio waves, vision cameras, magnets, or lasers for navigation. This way, a route is defined for controlling a passage of the apparatus 300 of the invention through all areas to be inventoried. The AVG can be equipped with additional sensors to adapt its displacement in function of a modification of its environment or a presence of an immediate danger. The AVG can be continuously monitored and controlled via the communication module 317 by the remote data processing system managing the inventory. A hand-checking between the AVG and the inventory system can be performed for controlling the position and for confirming the progress of the inventory.

Figure 6:
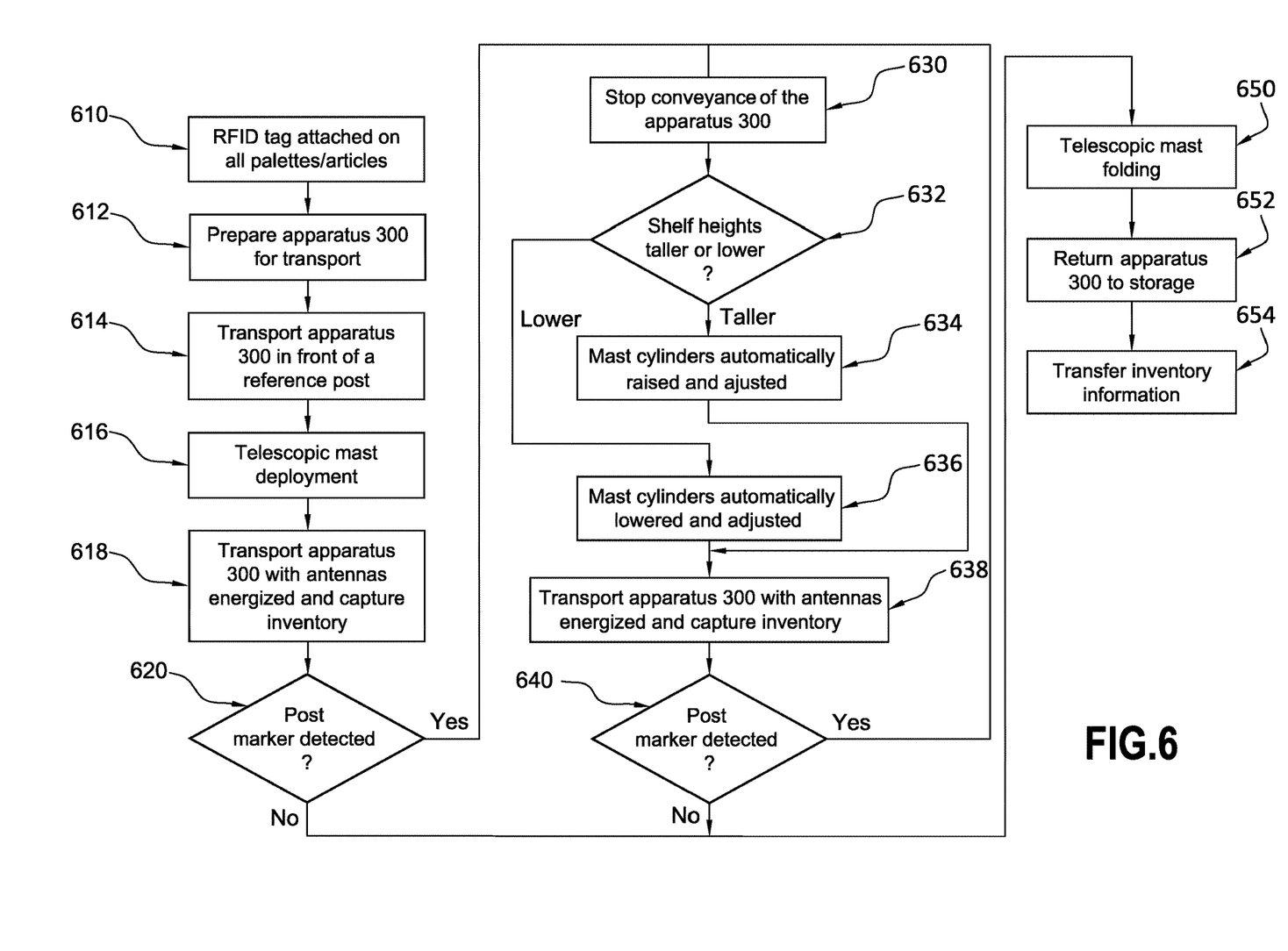
FIG. 6 illustrates a process for using an apparatus of the invention for inventorying a warehouse.

A method using the apparatus 300 for inventorying a warehouse is now described in reference with FIG. 6. In a preliminary act 610, an identifying RFID tag must have been attached on each of the pallets and/or articles which has to be inventoried. These identifying RFID tags can be read by the apparatus 300, which can then transfer collected information to a remote data processing system managing the warehouse inventory. Each identifying RFID tags includes a unique identification, which is known by the inventory system, and which can be stored in the remote data processing system or in the memory of the apparatus 300. In act 612, an operator prepares the apparatus 300 for transport and for performing the inventory. This preparation includes folding the telescopic mast 304 for transporting the apparatus 300 at high speed to the starting location for the inventory for example from the location where the apparatus 300 is stored. In the case of an apparatus 300 comprising a supporting pedestal 318, the operator operates a forklift so as to slide the forks of the forklift into the two longitudinal cavities 320 provided in the lower part of the supporting pedestal. Then, in act 614, the operator transports the apparatus 300 to the first aisle to be inventoried in the warehouse and stops at the entry of the first aisle so that the RFID antennas 302 are oriented with their emitting direction pointing towards the palettes and/or articles to be inventoried, i.e. the RFID antenna emitting surface is parallel to the front plane of the palette rack to be inventoried. In act 616, the operator deploys the telescopic mast. Firstly, the lowest mast cylinder 306 is deployed so that the associated RFID antenna is positioned at the targeted height for the lowest inventoried rack level, preferably corresponding to one third of the height of the rack level. Secondly, the second lowest mast cylinder is deployed so that the associated RFID antenna is positioned at the targeted height for the second lowest inventoried rack level. Thus, the telescopic mast deployment is performed starting with the lowest mast cylinder up to the highest mast cylinder. This method is preferred as the deployment of the lowest RFID antennas does not impact the position of the above RFID antennas. If the number of rack levels to be inventoried is lower than the number of mast cylinders, the remaining highest mast cylinders are not deployed.

In a preferred embodiment of the invention, the vertical positioning of the RFID antennas is automated by using height markers 507 and height sensors 314. The apparatus 300 is stopped near a reference post 508 located at the entry of the first aisle so that the RFID antennas 302 and the height sensors 314 are oriented in the direction of the height markers attached to the reference post. When a mast cylinder is deployed, the corresponding height sensor is activated and emits in the direction of the reference post. Based on the signal returned from a first height marker, which the height sensor detects, and eventually based on the fixed distance Hms 509 between the height marker and the corresponding shelf and based on the stored Hsa value 316 of the fixed distance Hsa between the height sensor and the corresponding RFID antenna and based on the distance between the targeted height for the RFID antenna and the corresponding shelf position, the mast controller 308 can determine the position where the mast cylinder deployment must be stopped, therefore positioning the corresponding RFID antenna at the correct height. Thus, the operator only has to initiate the deployment of the telescopic mast for the RFID antennas to be automatically positioned at their correct height.

Once the mast deployment is finalized, in act 618, the operator initiates the inventory capture and begins transporting the apparatus 300 along the first aisle of the warehouse. Preferably, the RFID antennas are automatically energized once the deployment of the telescopic mast is completed. In the particular case where each RFID antenna is used as a height sensor, the RFID antennas are energized one after the other during the mast deployment and are therefore all energized when the deployment of the telescopic mast is completed. As the apparatus 300 is transported along the first aisle of the warehouse, the identifying RFID tags of the pallets and/or the articles stored on the rack are read. In a preferred embodiment, information collected by the apparatus 300 is wirelessly transferred to a remote data processing system, which manages the warehouse inventory. Depending on the available memory capacity and processing capabilities of the computer unit of the apparatus 300, the information captured regarding the warehoused objects may be processed totally or partly, in real time or latter, by the computer unit or may be remotely processed by the remote data processing system.

If the shelf heights are homogeneous within the whole warehouse or within the area to be inventoried, no adjustment regarding the mast deployment is required. Otherwise, a post marker attached to an intermediate reference post is used for indicating that there is a change of shelf heights. When the post marker is detected by a height sensor (act 620), the conveyance of the apparatus 300 is stopped in front of the intermediate reference post for adjusting the telescopic mast deployment in act 630. The height sensors 314 are oriented in the direction of the height markers attached to this intermediate reference post. If the post marker is a RFID tag, because of the angular spread of the emission cone of the RFID height sensor, the post marker can be detected before the apparatus 300 arrives in front of the reference post. The computer unit can therefore operate a smooth automated stop exactly in front of the reference post.

In act 632, based on the information returned by the post marker to the height sensor, the computer unit interprets whether the shelf heights are taller or lower so that the telescopic mast may be automatically adjusted accordingly. For example, when the post marker is detected by the lowest height sensor, the computer unit interprets the shelf height is lower. When the post marker is detected by a height sensor other than the lowest height sensor, the computer unit interprets the shelf height is taller. If the shelf heights are interpreted as taller, in act 634 the mast cylinders are raised and adjusted in a similar manner as described above for the mast deployment. The mast adjustment is performed starting with the lowest mast cylinder up to the highest mast cylinder. When a mast cylinder is raised, the corresponding height sensor continues emitting in the direction of the reference post. Based on the signal returned from a first height marker, which the height sensor detects, and based on the fixed distance Hms 509 between the height marker and the corresponding shelf and based on the stored value 316 of the fixed distance Hsa between the height sensor and the corresponding RFID antenna, the mast controller 308 can determine the position where the raising of the mast cylinder must be stopped, therefore positioning the corresponding RFID antenna at the correct height. Thus, the telescopic mast is automatically adjusted for the RFID antennas to be positioned at their correct height.

If the shelf heights are interpreted as lower, in act 636 the mast cylinders are lowered and adjusted according to the following procedure. The mast adjustment is performed starting with the lowest mast cylinder up to the highest mast cylinder. When a mast cylinder is lowered, the corresponding height sensor continues emitting in the direction of the reference post. Based on the signal returned from a first height marker, which the height sensor detects, and based on the fixed distance Hms 509 between the height marker and the corresponding shelf and based on the stored value 316 of the fixed distance Hsa between the height sensor and the corresponding RFID antenna, the mast controller 308 can determine the position where the raising of the mast cylinder must be stopped, therefore positioning the corresponding RFID antenna at the correct height. Thus, the telescopic mast is automatically adjusted for the RFID antennas to be positioned at their correct height.

Once the mast deployment is finalized, in act 638, the operator resumes transporting the apparatus 300 along the aisle of the warehouse. As the apparatus 300 is transported along the first aisle of the warehouse, the identifying RFID tags of the pallets and/or the articles stored on the rack are read and the collected information is processed, thus is the inventory performed. As part of this inventory data capture, palette detection can be performed by presence sensors 410. If a palette is detected by a presence sensor, but no RFID signal is received by the corresponding RFID antenna, a warning explaining that identifying RFID tags may be missing is provided to the remote data processing system and/or to the operator via a user interface. If a presence sensor does not detect any presence, and no RFID signal is received by the corresponding RFID antenna, the system records an empty palette location and a mapping of empty palettes locations can be performed and can be displayed to the operator via the user interface.

If another intermediate post marker is detected by a height sensor (act 640), the conveyance of the apparatus 300 is stopped in front of this intermediate reference post for adjusting the mast deployment (return to act 630). Each aisle can be scanned with the apparatus 300, and once the scanning is completed, the telescopic mast can be folded in act 650 in preparation for transport. Each mast cylinder is lowered. The apparatus 300 is returned to storage in act 652. Inventory information collected by the apparatus 300 is transferred to the remote data processing system. When the apparatus 300 is equipped with wireless communication, inventory information may be transferred partly or totally while the apparatus is being transported.

The method can also be applied to a dual apparatus constituted of two telescopic masts. Such a dual apparatus can scan two face to face aisles of two parallel racks—each having an entry reference post. When the dual apparatus is stopped at the entry of an aisle with each of the two telescopic masts facing one of the entry reference posts, each of the two telescopic masts is deployed independently, eventually in parallel, based on the position of height markers of the entry reference posts. Then, the two face to face aisles are scanned in parallel while the dual apparatus is transported along the aisles. As soon as a post marker is detected in either of the two aisles, the dual apparatus is stopped in front of an intermediate reference post hosting the post marker, and the deployment of the telescopic mast facing the intermediate reference post is adjusted based on the positions of the height markers of the intermediate reference post. Then, the parallel scanning of the aisles can resume.

In a preferred embodiment of the invention, a dedicated height sensor is affixed onto the apparatus 300 at a fixed distance from the ground. Preferably, the dedicated height sensor is affixed onto the base 307, and may be, in the case of RFID, a low level RFID antenna 322. A post marker is attached onto each reference post at a fixed distance from the ground, which is essentially equal to the fixed distance between the dedicated height sensor and the ground. According to the invention, post markers are easily and systematically detected by the dedicated height sensor whatever the deployment conditions of the telescopic mast and whatever the positions of the RFID antennas. In particular, a post marker is detected whether the apparatus 300 passes by the post marker in a direction or in the reverse direction. Without the use of a dedicated height sensor, when a post marker is attached at the same height as one of the height markers of the preceding reference post for convenient detection, an aisle must be scanned in a particular direction from the entry to its end. The use of the dedicated height sensor allowing the detection of a post marker whether the apparatus 300 passes by the post marker in a direction or in the reverse direction, provides a warehouse compatible with a combined use of both single mast and dual masts apparatus, which may pass by a post marker in different directions.

When a RFID tag is used as a post marker and the dedicated height sensor is a RFID antenna, height data regarding the height positions for all the RFID antenna can be stored in the height information 524 the RFID post marker. Based on the height data read by the apparatus 300, the mast controller 308 can deploy the telescopic mast or adjust the telescopic mast deployment and position each RFID antenna at the targeted height. Then, height markers are not required anymore. However, the correct positioning of an antenna may be checked and ensured by a rangefinder attached to the apparatus 300.

In the particular embodiment of the invention where the apparatus 300 is attached to and conveyed by an Automatic Guided Vehicle (AVG), the method using the apparatus 300 for inventorying a warehouse can be applied particularly efficiently. The only humane action for performing a warehouse inventory may be limited to providing an order initiating the inventory, eventually sent wirelessly to the apparatus 300. Thereafter, the overall warehouse inventory can be carried out automatically by the apparatus 300 conveyed by the AVG. The AVG can transport the apparatus 300 to a pre-defined starting point or a starting point defined as part of the order for initiating the inventory—starting point which is typically an entry point of an aisle, in front of a reference post or a couple of reference posts for a dual apparatus. The telescopic mast or masts are automatically deployed based on the height markers attached on the reference posts, and eventually based on the height parameters stored in the height markers. The use of a dedicated height sensor affixed onto the apparatus 300 at a fixed distance from the ground, in this particular embodiment of the invention where the apparatus 300 is attached to and conveyed by an AVG, is particularly convenient for allowing the detection of a post marker whether the apparatus 300 passes by the post marker in a direction or in the reverse direction.

The different embodiments of the invention described above allow for easier and more reliable warehouse inventories, which can therefore be performed more regularly. By carrying out inventories regularly, a logistic provider has a better vision of his actual stock and can better manage supply and improve picking, therefore optimizing his stock.

Although the embodiments of the invention have been described in the case of inventories and more particularly for warehouses inventories, it is to be understood that the invention is not limited to the disclosed embodiments. The invention can apply to any type of storage including general stores, workshops or libraries. More generally, the invention also may apply to objects tracking in logistics processes or in points of sales.

The invention claimed is:

1. A system to inventory items, said system comprising an apparatus to read identifying radio frequency identification (RFID) tags stored on palette racks that comprise at least one vertical reference post equipped with at least one post marker, said apparatus comprising:
    at least one telescopic mast comprising a set of at least two cylinders, said at least one telescopic mast which can be vertically deployed and folded, wherein at least one of said at least two cylinders is slideably received by another one of said at least two cylinder to adjust a length of said at least one telescopic mast,
    at least one RFID antenna mounted onto said telescopic mast for emitting RFID signals towards said identifying RFID tags stored on the palette racks comprising the at least one vertical reference post equipped with the at least one post marker and for receiving response messages from said identifying RFID tags,
    a RFID reader for energizing said at least one RFID antenna and for reading said identifying RFID tags stored on said palette racks,
    a computer communicatively coupled to control said RFID reader and to store, and
    at least one height sensor for detecting said at least one post marker of said at least one vertical reference post.

2. The system according claim 1, wherein said at least one height sensor and said at least one RFID antenna are attached on each of said at least two cylinders.

3. The system according to claim 1, wherein said at least one height sensor is positioned at a fixed vertical distance from the center of said at least one RFID antenna, wherein a value of said fixed vertical distance is stored by said computer.

4. The system according to claim 1, wherein said apparatus further comprises a supporting pedestal and said supporting pedestal is shaped with two parallel longitudinal cavities to be handled by a forklift, and at least one of said at least one RFID antenna is oriented and is emitting in a direction perpendicular to a longitudinal axis of said two parallel longitudinal cavities.

5. The system according to claim 1, wherein said palette racks comprise several rack levels and, for each rack level of said palette racks, a height marker is attached on said at least one vertical reference post at a same distance above a shelf corresponding to said rack level, wherein said height marker is an optical reflector or a RFID tag.

6. The system according to claim 5, wherein said height marker is attached on said at least one vertical reference post at a same distance above a shelf corresponding to said rack level, wherein, when said height marker is a RFID tag, said at least one height sensor is said at least one RFID antenna and height values are stored in said height marker and said computer calculates a travel adjustment (Ta) for said at least two cylinders based on said height values, and wherein said at least one post marker is attached at the same height as said height marker.

7. The system according to claim 1 wherein said at least one post marker is a RFID tag and said computer calculates a travel adjustment Ta for said at least two cylinders based on height information stored in said post marker.

8. The system according to claim 1 wherein said height information comprising a height indicator indicating a change in shelf height and whether said shelf height is taller or lower, is stored by said post marker.

9. An apparatus for inventorying items by reading identifying radio frequency identification (RFID) tags stored on palette racks comprising at least one vertical reference post equipped with at least one post marker, the apparatus comprising:
    at least one telescopic mast comprising a set of at least two cylinders, which can be vertically deployed and folded, wherein at least one of said at least two cylinders is slideably received by another one of said at least two cylinder,
    at least one RFID antenna mounted onto said telescopic mast to emit RFID signals towards said identifying RFID tags stored on the palette racks and to receive response messages from said identifying RFID tags,
    a RFID reader communicatively coupled to energize said at least one RFID antenna and to read said identifying RFID tags,
    a computer communicatively coupled to control said RFID reader and storing data, and
    at least one height sensor positioned to detect said at least one post marker of said at least one vertical reference post.

10. The apparatus according claim 9, wherein at least one height sensor and said at least one RFID antenna are attached on each of said at least two cylinders.

11. The apparatus according to claim 9, wherein said at least one height sensor is positioned at a fixed vertical distance from the center of said at least one RFID antenna and a value of said fixed vertical distance is stored in said computer.

12. The apparatus according to claim 9, wherein a supporting pedestal of said apparatus is shaped with two parallel longitudinal cavities for being easily handled by a forklift, wherein said at least one RFID antenna is oriented to emit in a direction perpendicular to a longitudinal axis of said two parallel longitudinal cavities, and at least one presence sensor is attached onto said at least two cylinders to detect a presence of a palette wherein said computer is operable to display empty palettes locations or to provide a warning indicating that identifying RFID tags may be missing when a palette is detected by a presence sensor and no RFID signal is received by the corresponding RFID antenna.

13. The apparatus according to claim 9, wherein said apparatus comprises two telescopic masts, each comprising a respective one or more of said at least one RFID antenna.

14. The apparatus according to claim 9, wherein said apparatus comprises one telescopic mast comprising two sets of said at least one RFID antenna, each set emitting in an opposite direction of the other one.

15. The apparatus according to claim 9, wherein said apparatus is attached to and conveyed by an automatic guided vehicle.

16. A method for inventorying items with an apparatus by reading attached identifying radio frequency identification (RFID) tags stored on palette racks comprising at least one vertical reference post equipped with at least one post marker within a warehouse comprising:
deploying vertically a set of at least two cylinders of a telescopic mast of said apparatus, wherein at least one of said at least two cylinders is slideably received by another one of said at least two cylinder,
reading said identifying RFID tags by said apparatus with RFID antennas mounted onto said telescopic mast, wherein said RFID antennas are energized by a RFID reader,
when said at least one post marker attached onto said at least one vertical reference post is detected by height sensors of said apparatus,
identifying said at least one vertical reference post based on the reading of said at least one post marker, and
adjusting the vertical deployment of said telescopic mast before continuing reading said identifying RFID tags, and
folding vertically said telescopic mast when all items are inventoried.

17. The method according to claim 16, wherein said telescopic mast is deployed starting with the lowest cylinder up to the highest cylinder and one height sensor amongst said height sensors and one RFID antenna amongst said RFID antennas are attached onto each of said at least two cylinders.

18. The method according to claim 17, wherein said palette racks comprise several rack levels and for each rack level of said palette racks, a height marker is attached on said at least one vertical reference post at a same distance above a shelf corresponding to said rack level, and further comprising:
orienting said height sensors in the direction of said height markers,
activating said one height sensor,
raising said at least two cylinders,
capturing a signal returned from a height marker detected by said height sensor,
determining a position of said at least two cylinders based on said returned signal and based on a fixed distance Hms between height markers and corresponding shelves of said palette racks and based on a stored value of a fixed vertical distance Hsa between said one height sensor and said one RFID antenna, and
stopping the raising of said at least two cylinders according to the determined position.

19. The method according to claim 18, further comprising:
initiating inventory capture,
automatically energizing said RFID antennas,
transporting said apparatus along an aisle of said warehouse, while reading said attached identifying tags with said RFID reader,
processing into data totally or partly information read from said attached identifying tags or from said at least one post marker or said height markers affixed onto said palette racks,
wirelessly transferring said data to a remote data processing system,
reading said at least one post marker while transporting said apparatus along an aisle of said warehouse,
stopping in front of at least one post marker for adjusting said telescopic mast deployment,
if said post marker is detected by the lowest height sensor, interpreting shelf height as lower and lowering said at least two cylinders starting with the lowest cylinder up to the highest cylinder and stopping lowering said at least two cylinders based on a signal returned from a height marker, and
if said post marker is detected by a height sensor other than the lowest height sensor, interpreting shelf height as taller and raising said at least two cylinders starting with the lowest cylinder up to the highest cylinder and stopping raising said at least two cylinders based on a signal returned from a height marker.

20. The method according to claim 17, wherein said palette racks comprise several rack levels and for each rack level of said palette racks, a height marker is attached on said at least one vertical reference post at a same distance above a shelf corresponding to said rack level, and said at least one post marker is a RFID tag and said height sensors are said RFID antennas, the method further comprising:
orienting said height sensors in the direction of said height markers,
activating said one height sensor,
raising said at least two cylinders,
capturing a signal returned from a height marker detected by said one height sensor,
calculating a travel adjustment Ta based on a distance H between a targeted height for said one RFID antenna and a corresponding shelf position and based on a fixed distance Hms between said height markers and corresponding shelves of said palette racks, wherein said travel adjustment is calculated according to the formula: $Ta=H-Hms$, and wherein high values corresponding to said distance H and to said fixed distance Hms are stored in said at least one post marker,
continuing raising said at least two cylinders according to said travel adjustment, and
stopping the raising of said at least two cylinders.

\* \* \* \* \*